United States Patent
Arihara et al.

(10) Patent No.: US 9,991,522 B2
(45) Date of Patent: Jun. 5, 2018

(54) CATALYST PARTICLES FOR FUEL CELLS AND METHOD FOR PRODUCING SAME

(71) Applicant: NISSAN MOTOR CO., LTD., Yokohama-shi, Kanagawa (JP)

(72) Inventors: Kazuki Arihara, Yokosuka (JP); Hiroyuki Tanaka, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days. days.

(21) Appl. No.: 14/769,988

(22) PCT Filed: Jan. 22, 2014

(86) PCT No.: PCT/JP2014/051199
§ 371 (c)(1),
(2) Date: Aug. 24, 2015

(87) PCT Pub. No.: WO2014/129253
PCT Pub. Date: Aug. 28, 2014

(65) Prior Publication Data
US 2016/0013494 A1 Jan. 14, 2016

(30) Foreign Application Priority Data
Feb. 25, 2013 (JP) .................................. 2013-034297

(51) Int. Cl.
*H01M 4/92* (2006.01)
*H01M 4/88* (2006.01)
(Continued)

(52) U.S. Cl.
CPC ........... *H01M 4/92* (2013.01); *C23C 18/1637* (2013.01); *C23C 18/44* (2013.01); *H01M 4/8657* (2013.01);
(Continued)

(58) Field of Classification Search
None
See application file for complete search history.

(56) References Cited

U.S. PATENT DOCUMENTS

2007/0092768 A1* 4/2007 Lee ........................ B01J 23/56
502/104
2009/0054228 A1 2/2009 Ichikawa et al.
(Continued)

FOREIGN PATENT DOCUMENTS

JP 2005-251455 A 9/2005
JP 2008-153192 A 7/2008
(Continued)

OTHER PUBLICATIONS

Chen et al., "Ni—Pt Core-Shell Nanoparticles as Oxygen Reduction Electrocatalysts: Effect of Pt Shell Coverage," Nov. 1, 2011, Journal of Physical Chemistry, 115, 24073-24079.*
(Continued)

*Primary Examiner* — Ula C Ruddock
*Assistant Examiner* — Matthew W Van Oudenaren
(74) *Attorney, Agent, or Firm* — Foley & Lardner LLP

(57) ABSTRACT

A catalyst particle (1) for a fuel cell according to the present invention includes: a metal particle (2) composed of either one of metal other than noble metal and an alloy of the metal other than the noble metal and the noble metal; and a noble metal layer (3) that is provided on a surface of the metal particle and has a thickness of 1 nm to 3.2 nm. By the fact that the catalyst particle for a fuel cell has such a configuration, the catalyst particle can enhance catalytic activity while reducing an amount of the noble metal. The catalyst particle (1) for a fuel cell according to the present invention can enhance the catalytic activity while reducing the amount of the noble metal.

10 Claims, 5 Drawing Sheets

(51) Int. Cl.
*C23C 18/16* (2006.01)
*C23C 18/44* (2006.01)
*H01M 4/86* (2006.01)
*H01M 4/90* (2006.01)

(52) U.S. Cl.
CPC ....... *H01M 4/8842* (2013.01); *H01M 4/9041* (2013.01); *H01M 4/9058* (2013.01); *H01M 4/9075* (2013.01); *H01M 4/926* (2013.01)

(56) References Cited

U.S. PATENT DOCUMENTS

| | | | |
|---|---|---|---|
| 2010/0062929 A1* | 3/2010 | Virkar | B01J 23/40 502/304 |
| 2010/0086832 A1 | 4/2010 | Lopez et al. | |
| 2010/0092841 A1* | 4/2010 | Lopez | B22F 1/0018 429/409 |
| 2011/0086295 A1 | 4/2011 | Lopez et al. | |
| 2012/0046164 A1 | 2/2012 | Tanaka et al. | |
| 2012/0321996 A1* | 12/2012 | Ito | H01M 4/8657 429/524 |

FOREIGN PATENT DOCUMENTS

| | | |
|---|---|---|
| JP | 2009-45583 A | 3/2009 |
| JP | 2010-501344 A | 1/2010 |
| JP | 2012-41581 A | 3/2012 |
| JP | 2014-108380 A | 6/2014 |
| WO | WO 2011/108162 A1 | 9/2011 |
| WO | WO2011108162 * | 9/2011 |

OTHER PUBLICATIONS

Zhang, J. et al., "Platinum Monolayer on Nonnoble Metal—Noble Metal Core—Shell Nanoparticie Electrocatalysts for $O_2$ Reduction", *Journal of Physical Chemistry B, American Chemical Society*, vol. 109, Nov. 11 2005, pp. 22701-22704.

Yumei, Chen et al., "Ni@Pt Core-Shell Nanoparticles: Synthesis, Structural and Electrochemical Properties", *Journal of Physical Chemistry, American Chemical Society*, vol. 12, No. 5, Jan. 16, 2008, pp. 1645-1649.

* cited by examiner

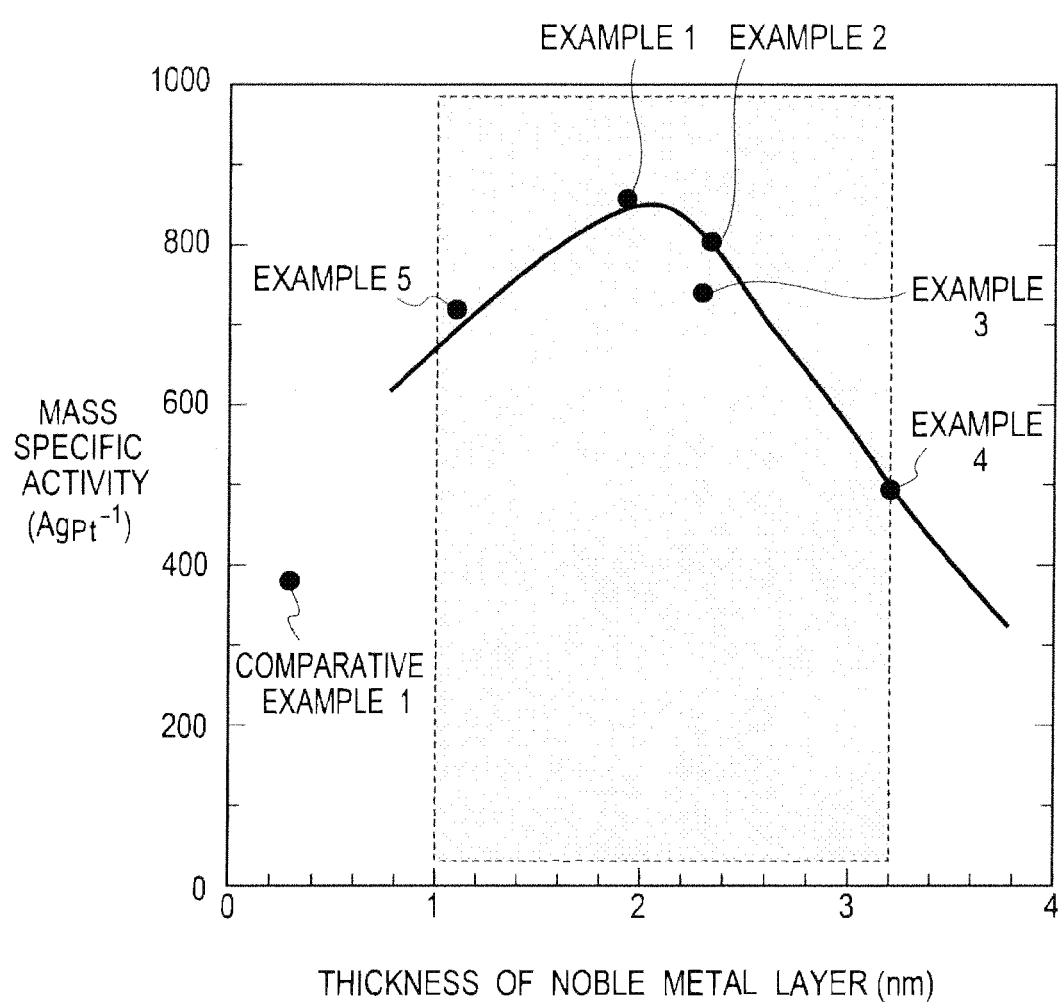

CATALYST PARTICLES FOR FUEL CELLS AND METHOD FOR PRODUCING SAME

TECHNICAL FIELD

The present invention relates to catalyst particles for fuel cells and a method for producing the same. More specifically, the present invention relates to catalyst particles for fuel cells, which are capable of realizing excellent power generation performance, and to a method for producing the same.

BACKGROUND ART

In general, a polymer electrolyte fuel cell has a structure in which a plurality of single cells which exert a power generation function are stacked on one another. In usual, each of the single cells includes a membrane electrode assembly having a polymer electrolyte membrane and a pair of electrode catalyst layers which sandwich the polymer electrolyte membrane. Then, the membrane electrode assembly in each of the single cells is electrically connected to a membrane electrode assembly of other single cell, which is adjacent thereto, through a separator. The single cells are stacked on and connected to one another as described above, whereby a fuel cell stack is configured. Then, this fuel cell stack can function as power generation means usable for a variety of purposes.

A brief description is made of a power generation mechanism of the polymer electrolyte fuel cell. At an operation time of the polymer electrolyte fuel cell, fuel gas (for example, hydrogen gas) is supplied to an anode side of the single cell, and oxidant gas (for example, atmosphere or oxygen) is supplied to a cathode side thereof. As a result, individually in an anode and a cathode, there progress electrochemical reactions represented by the following Reaction formula (I) and (II), whereby electricity is generated.

$$H^2 \rightarrow 2H^+ + 2e^- \quad (I)$$

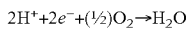

$$2H^+ + 2e^- + (\tfrac{1}{2})O_2 \rightarrow H_2O \quad (II)$$

Here, in order to enhance the power generation performance, it is particularly important to enhance catalytic activity in the electrode catalyst layers. Heretofore, as a catalyst in the electrode catalyst layers, a catalyst is disclosed, which includes a particulate underlayer and a platinum layer formed on the underlayer, in which a thickness of the platinum layer is 0.4 nm or more to less than 1 nm (for example, refer to Patent Literature 1).

CITATION LIST

Patent Document

[PTL 1] Japanese Unexamined Patent Application Publication No. 2009-45583

SUMMARY OF THE INVENTION

However, as a result of study by the inventors of the present invention, there was a problem that the catalytic activity of the catalyst described in Patent Literature 1 was still insufficient.

The present invention has been made in consideration of the problem inherent in the prior art. Then, it is an object of the present invention to provide catalyst particles for fuel cells, which are excellent in catalytic activity even in a case of reducing an amount of noble metal, and to provide a method for producing the same.

A catalyst particle for a fuel cell according to a first aspect of the present invention includes: a metal particle composed of either one of metal other than noble metal and an alloy of the metal other than the noble metal and the noble metal; and a noble metal layer that is provided on a surface of the metal particle and has a thickness of 1 nm to 3.2 nm.

A method for producing a catalyst particle for a fuel cell according to a second aspect of the present invention includes the steps of: preparing a precursor solution by dispersing salt of metal other than noble metal or a complex of the metal other than the noble metal into a solvent, and thereafter, preparing a metal particle dispersion by adding a reducing agent to the precursor solution; and forming a noble metal layer on a surface of a metal particle by adding noble metal salt or a noble metal complex to the metal particle dispersion.

BRIEF DESCRIPTION OF DRAWINGS

FIG. 6 is a graph showing a relationship between a thickness of a noble metal layer and the mass specific activity in each of Examples.

DESCRIPTION OF EMBODIMENTS

Figure 1:
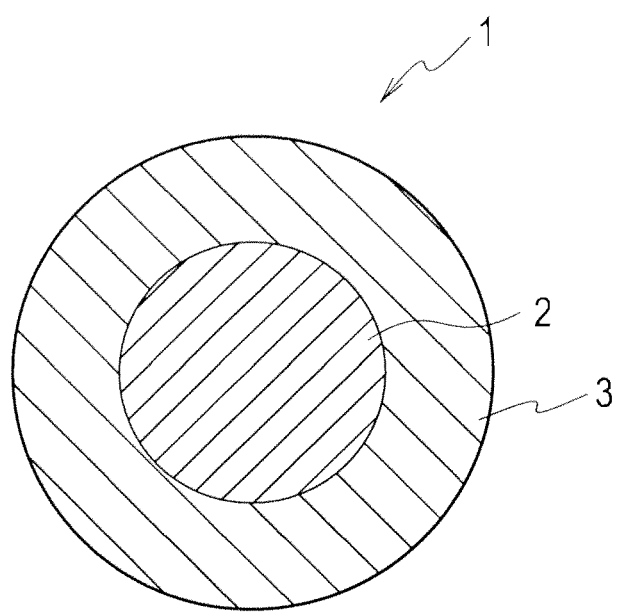
FIG. 1 is a cross-sectional view schematically showing a catalyst particle for fuel cells according to an embodiment of the present invention.

A description is made below in detail of a catalyst particle for fuel cells according to embodiments of the present invention and a method for producing the same while referring to the drawings. Note that dimensional ratios in the drawings, which are incorporated by reference in the following embodiments, are exaggerated for convenience of explanation, and are different from actual ratios in some case.

[Catalyst Particles for Fuel Cells]

As shown in FIG. 1, a catalyst particle 1 for fuel cells (which is hereinafter also simply referred to as a catalyst particle) according to an embodiment of the present invention includes: a metal particle 2; and a noble metal layer 3 provided on a surface of the metal particle 2. Then, the catalyst particle 1 is characterized in that a thickness of the noble metal layer 3 is 1 to 3.2 nm.

In comparison with a conventional one, in the catalyst particle 1 of this embodiment, the noble metal layer 3 is formed thick. That is to say, on the surface of the noble metal layer 3, there progress the electrochemical reactions represented by the above-described Reaction formulae (I) and (II), and accordingly, the thickness of the noble metal layer 3 is optimized within the above-mentioned range, thus making it possible to enhance activity per unit mass of the noble metal of the catalyst particle (that is, mass specific activity).

From a viewpoint of accelerating the above-described electrochemical reaction, it is necessary for the noble metal layer 3 to contain at least noble metal. Specifically, it is preferable that the noble metal layer 3 contain at least one selected from the group consisting of platinum (Pt), palladium (Pd), gold (Au), iridium (Ir), ruthenium (Ru) and silver (Ag). Moreover, it is more preferable that the noble metal layer 3 contain at least platinum (Pt). Platinum is less soluble even in an acidic medium, and in addition, is excellent in catalytic activity, and accordingly, is particularly preferable as a material of the noble metal layer 3.

It is preferable that the noble metal layer 3 contain the above-described noble metal as a main component. That is to say, it is preferable that a content of the noble metal in the noble metal layer 3 be 50 mol % or more. However, from a viewpoint of enhancing the catalytic activity on the surface of the noble metal layer 3, the noble metal layer 3 may contain an element other than the noble metal. Specifically, at least one selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo) and tantalum (Ta) may be contained. Note that, with regard to the content of the noble metal in the noble metal layer 3, 80 mol % or more is more preferable, 90 mol % or more is further preferable, and 100 mol % is particularly preferable.

Note that it is necessary that the thickness of the noble metal layer 3 be 1 nm to 3.2 nm. By the fact that the thickness is within this range, it becomes possible to obtain such catalyst particles excellent in catalytic activity as shown in examples to be described later. Moreover, it is particularly preferable that the thickness of the noble metal layer 3 be 1.9 nm to 2.4 nm. By the fact that the thickness of the noble metal layer 3 is within this range, it becomes possible to obtain such catalyst particles particularly excellent in catalytic activity while reducing an amount of the noble metal. Note that it is possible to calculate the thickness of the noble metal layer 3 and a particle diameter of the metal particle 2, which will be described later, by line analysis of transmission electron microscope-energy dispersive X-ray spectrometry (TEM-EDX).

It is preferable that the noble metal layer 3 form a layered structure in which a plurality of monoatomic layers of the noble metal are stacked on one another. By the fact that the noble metal layer 3 has such a layered structure, an outermost surface structure of the noble metal layers is optimized, thus making it possible to further enhance the mass specific activity.

The metal particle 2 is characterized in being composed of either one of metal other than the noble metal and an alloy of the metal other than the noble metal and the noble metal. By the fact that the metal particle that forms a core of the catalyst particle contains such metal other than the noble metal as described above, it becomes possible to maintain high catalytic activity for reaction gas while reducing the amount of the noble metal.

In the metal particle 2, it is preferable to use transition metal as the metal other than the noble metal. Specifically, it is preferable that the metal particle 2 contain at least one selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo) and tantalum (Ta). By the fact that such metal as described above is used as the metal particle 2, the mass specific activity can be further enhanced while reducing a used amount of the noble metal. Moreover, by the fact that such metal as described above is used, it becomes possible to strike a balance between an area specific activity and an activity maintenance factor.

As described above, as the metal particle, a particle made of the metal other than the noble metal can be used; however, the alloy of the metal other than the noble metal and the noble metal can also be used. By the fact that such an alloy as described above is used as the metal particle 2, activity per unit area (that is, area specific activity) of the catalyst particle can be maintained in a high state. Moreover, the activity maintenance factor of the catalyst particle (that is, a ratio of the catalytic activity after elapse of a fixed time with respect to catalyst activity when a fuel cell using the catalyst particle is driven for the first time) can also be maintained in a high state.

It is preferable to use transition metal as the metal other than the noble metal, the other metal serving for forming the alloy. Specifically, it is preferable to use at least one selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo) and tantalum (Ta). Moreover, as the noble metal for forming the alloy, it is preferable to use at least one selected from the group consisting of platinum (Pt), palladium (Pd), gold (Au), iridium (Ir), ruthenium (Ru) and silver (Ag).

Note that it is preferable that the metal particle 2 contain, as a main component, the above-mentioned metal other than the noble metal. That is to say, it is preferable that a content of the metal other than the noble metal in the metal particle 2 be 50 mol % or more. Note that, with regard to the content of the metal other than the noble metal in the metal particle 2, 80 mol % is more preferable, and 90 mol % or more is further preferable.

It is preferable that the particle diameter of the metal particle 2 be 2 nm to 5.5 nm. By the fact such a fine particle is used as the core of the catalyst particle, a specific surface area of the noble metal layer 3 that covers a periphery thereof is increased, thus making it possible to enhance the mass specific activity.

It is most preferable that the noble metal layer 3 cover an entirety of the surface of the metal particle 2. However, from a viewpoint of increasing a surface area of the noble metal layer 3 and increasing a three-phase interface (electrolyte-catalyst particle-reaction gas), it is preferable that the noble metal layer 3 cover at least 60% or more of the surface of the metal particle 2. Moreover, it is more preferable that the noble metal layer 3 cover 80% or more of the surface of the metal particle 2, and it is further preferable that the noble metal layer 3 cover 90% or more thereof.

As described above, the catalyst particle of this embodiment includes: the metal particle containing the metal other than the noble metal; and the noble metal layer, which is provided on the surface of the metal particle, and has a thickness of 1 nm to 3.2 nm. With such a configuration, the outermost structure of the noble metal layer is optimized, and it becomes possible to further enhance the mass specific activity while reducing the used amount of the noble metal. Note that, in a case of using the catalyst particle of this embodiment for an electrode catalyst layer of a fuel cell, it is preferable to carry the catalyst particle on a conductive carrier.

[Method for Producing Catalyst Particles for Fuel Cells]

Next, a description is made of a method for producing the catalyst particle for fuel cells according to this embodiment.

In the method for producing the catalyst particle for fuel cells according to this embodiment, first, a precursor solution is prepared by dispersing, into a solvent, salt of the metal other than the noble metal or a complex of the metal other than the noble metal, and thereafter, a reducing agent is added to the precursor solution, whereby a metal particle dispersion is prepared. Next, noble metal salt or noble metal complex is added to the metal particle dispersion, whereby a noble metal layer is formed on the surface of each of the metal particles. In such a way, it becomes possible to obtain the above-mentioned catalyst particle.

Specifically, first, the salt or complex of the metal other than the noble metal, which composes the metal particle 2, is dispersed into the solvent, and the precursor solution in which the metal other than the noble metal is dissolved is prepared. Note that it is preferable that the salt of the metal other than the noble metal or the complex of the metal other than the noble metal contain at least one selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo) and tantalum (Ta).

Here, as the salt or complex of the metal other than the noble metal, there can be used nitrate of the metal other than the noble metal, sulfate thereof, ammonium salt thereof, amine thereof, carbonate thereof, bicarbonate thereof, halide such as bromide and chloride thereof, nitrite thereof, mineral salts such as oxalic acid thereof, sulfamate thereof, carboxylate such as formate thereof, hydroxide thereof, alkoxide thereof, oxide thereof, an ammine complex thereof, a cyano complex thereof, a halogeno complex thereof, a hydroxy complex thereof, and the like. That is to say, compounds, in which the metal other than the noble metal can become metal ions in the solvent such as pure water, are preferably mentioned. Among them, as the salt or complex of the metal other than the noble metal, halide (chloride in particular), sulfate and nitrate are more preferable. Note that, as the solvent, pure water can be used.

Next, the reducing agent is added to the precursor solution in which the metal other than the noble metal is dissolved, and the metal other than the noble metal is precipitated, whereby the metal particle dispersion in which the fine metal particles are dispersed is prepared. As the reducing agent, there can be used ethanol, methanol, propanol, formic acid, formate such as sodium formate and potassium formate, formaldehyde, sodium thiosulfate, citric acid, citrate such as sodium citrate, sodium borohydride ($NaBH_4$), hydrazine ($N_2H_4$) and the like. In this event, an additive amount of the reducing agent is not particularly limited as long as the additive amount is an amount by which the metal can be reduced sufficiently and the fine metal particles can be prepared; however, for example, it is preferable to pour the reducing agent of which number of moles is 1 to 200 times with respect to the number of moles of the metal other than the noble metal.

Note that it is preferable that a concentration of the metal other than the noble metal in the above-described precursor solution be 2.5 mM or less. The concentration of the metal is set to 2.5 mM or less, thus making it possible to suppress aggregation of the fine metal particles in the metal particle dispersion.

Next, the noble metal salt or the noble metal complex is added to the metal particle dispersion, whereby the noble metal layer is formed on the surface of each of the metal particles. That is to say, the noble metal salt is added to the metal particle dispersion, whereby the noble metal salt is dissolved into the dispersion, and generated noble metal ions receive electrons from the metal particle in the dispersion. As a result, the noble metal ions are reduced on the surface of the metal particle, and the noble metal layer is precipitated.

Note that it is preferable that the noble metal salt or the noble metal complex contain at least one selected from the group consisting of platinum, palladium, gold, iridium, ruthenium and silver. Moreover, since it is preferable that the noble metal layer contain at least platinum as mentioned above, it is preferable that the noble metal salt or the noble metal complex contain at least platinum.

As the noble metal salt or the noble metal complex, which is as described above, there can be used nitrate of the noble metal, sulfate thereof, ammonium salt thereof, amine thereof, carbonate thereof, bicarbonate thereof, halide such as bromide and chloride thereof, nitrite thereof, mineral salts such as oxalic acid thereof, sulfamate thereof, carboxylate such as formate thereof, hydroxide thereof, alkoxide thereof, an ammine complex thereof, a cyano complex thereof, a halogeno complex thereof, a hydroxy complex thereof, and the like. Among them, the ammine complex and the halogeno complex are more preferable as the salt or complex of the noble metal.

Note that, in a case where the noble metal complex is added to the metal particle dispersion, there progresses a substitution reaction of the metal of the metal particle and the noble metal ions of the noble metal complex. Thus, the noble metal ions are inserted into the metal particle, and the particle containing alloy of the metal other than the noble metal and the noble metal is obtained as the metal particle. Moreover, simultaneously with the above-described substitution reaction, a reduction reaction of the noble metal ions progresses on the surface of metal particle, and the noble metal layer is precipitated. In such a way, a catalyst particle can be obtained, which includes the noble metal layer on the surface of the metal particle composed of the metal other than the noble metal and the noble metal.

In an event of preparing such catalyst particles, it is preferable to mix raw materials of the metal other than the noble metal and the noble metal so that a ratio ([number of moles of the metal other than the noble metal]/[number of moles of the noble metal]) of the number of moles of the metal other than the noble metal with respect to the number of moles of the noble metal can be 3.2 to 11. Such a mixture ratio is set, thus making it possible to easily control the film thickness of the noble metal layer to 1 nm to 3.2 nm.

In a case of isolating such catalyst particles obtained as mentioned above, the catalyst particles just need to be filtrated and dried. Moreover, in a case of carrying the obtained catalyst particles on a conductive carrier to be described later, first, the conductive carrier is poured into the dispersion of the catalyst particles, and is stirred, whereby the catalyst particles are adsorbed onto the conductive carrier. Thereafter, the conductive carrier onto which the catalyst particles are adsorbed is filtrated and dried, whereby an electrode catalyst, in which the catalyst particles are dispersed in the conductive carrier, can be obtained. Note that the drying of the catalyst particles and the electrode catalyst may be performed in air or under an inert gas atmosphere, or may be performed at a reduced pressure. Moreover, a drying temperature is not particularly limited; however, for example, the drying can be performed within an approximate range of room temperature (25° C.) to 100° C.

[Fuel Cell]

Figure 2:
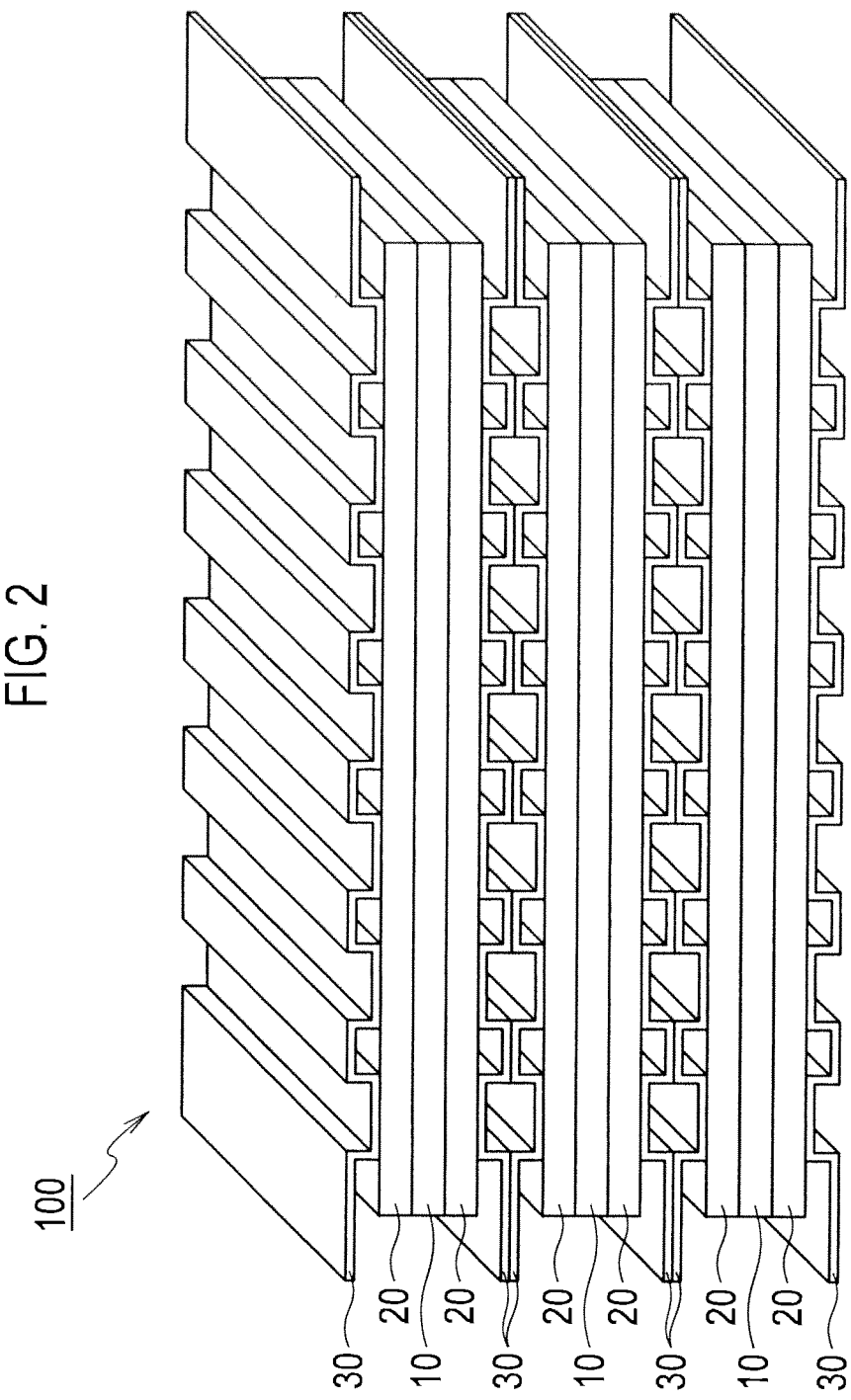
FIG. 2 is a perspective view showing an outline of a stack of the fuel cell according to the embodiment of the present invention.
Figure 3:
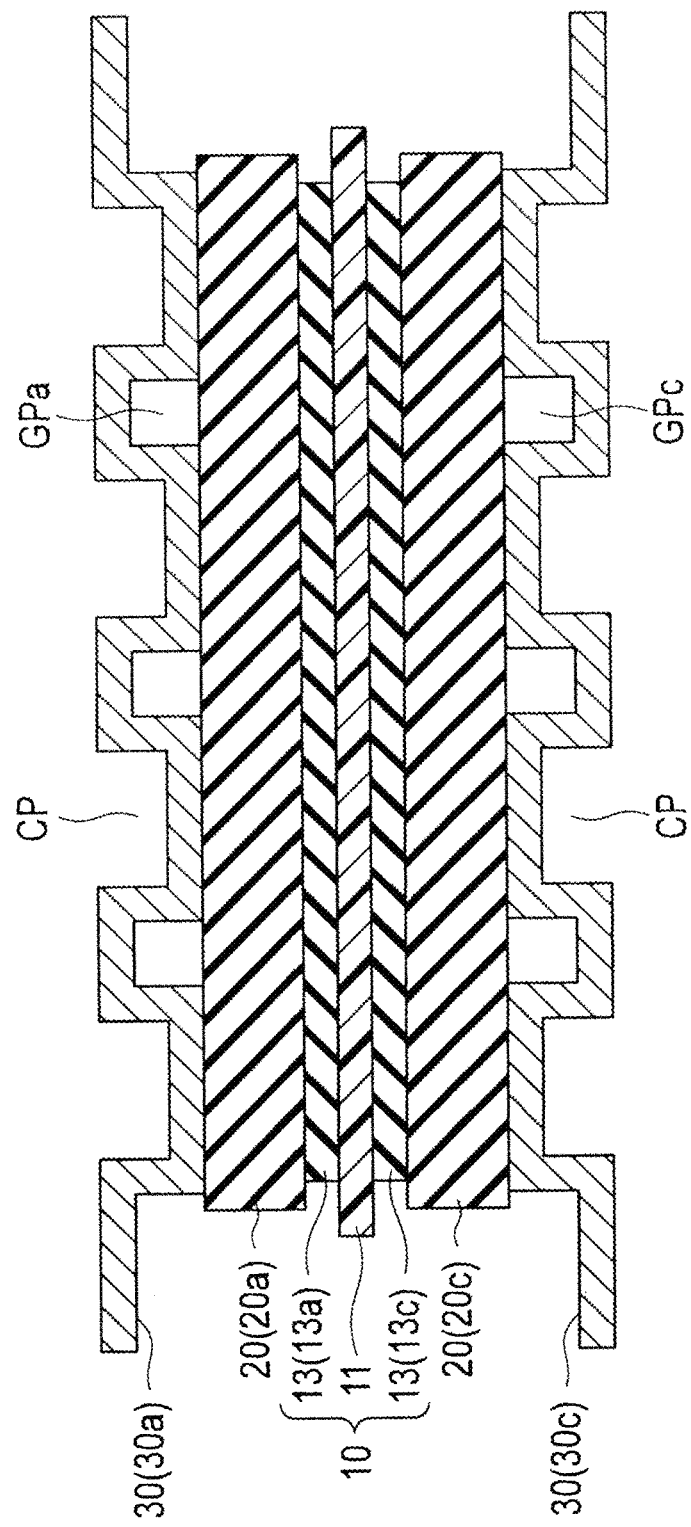
FIG. 3 is a cross-sectional view schematically showing a basic configuration of the fuel cell.

Next, a description is made of a fuel cell using the catalyst particles for fuel cells according to this embodiment. FIG. 2 shows an outline of a stack of a polymer electrolyte fuel cell that is a typical example of the fuel cell according to the embodiment of the present invention. Moreover, FIG. 3 schematically shows a basic configuration of the polymer electrolyte fuel cell.

As shown in FIG. 2, in this embodiment, a fuel cell 100 includes: membrane electrode assemblies 10; and pairs of gas diffusion layers (GDLs) 20, each pair of which sandwiches the membrane electrode assembly 10 therebetween. Moreover, the fuel cell 100 includes pairs of separators 30, each pair of which sandwiches the membrane electrode assembly 10 and the gas diffusion layers 20 therebetween.

In the fuel cell, the membrane electrode assemblies exert a power generation function, and the gas diffusion layers diffuse feed gas. Then, the separators separate fuel gas and oxidant gas, which are to be supplied to anodes and cathodes, from each other, and in addition, electrically connect the membrane electrode assemblies, which are adjacent to one another, to one another. The membrane electrode assemblies are stacked on and connected to one another in such a manner as described above, whereby the fuel cell is configured.

Note that, in the fuel cell, on a periphery thereof, that is, between each of the separators and a solid polymer electrolyte membrane to be described later, and between each of the membrane electrode assemblies and other membrane electrode assembly adjacent thereto, gas seal members are arranged. However, in FIG. 2 and FIG. 3, illustration of the gas seal members is omitted. Moreover, in the fuel cell, manifold members, which function as coupling means for coupling the respective cells to one another in an event where the stack is formed, are arranged. However, in FIG. 2, illustration of the manifold members is omitted.

As shown in FIG. 3, in this embodiment, the membrane electrode assembly 10 includes: a polymer electrolyte membrane 11; and a pair of electrode catalyst layers 13 (anode electrode catalyst layer 13a, cathode electrode catalyst layer 13c) which sandwich the polymer electrolyte membrane therebetween. Moreover, the membrane electrode assembly 10 is sandwiched by the pair of gas diffusion layers 20 (anode gas diffusion layer 20a, cathode gas diffusion layer 20c). Furthermore, the membrane electrode assembly 10 and the gas diffusion layers 20 are sandwiched by the pair of separators 30 (anode separator 30a, cathode separator 30c).

The separators 30 have an concavo-convex shape as shown in FIG. 3. Protruding portions of the anode separator 30a and the cathode separator 30c when viewed from the membrane electrode assembly 10 side are in contact with the gas diffusion layers 20. In such a way, electrical connection of the separators 30 to the membrane electrode assembly 10 is ensured. Furthermore, in a case where the anode separator 30a and the cathode separator 30c are viewed from the membrane electrode assembly 10 side, recessed portions are formed as spaces between the separators 30 and the gas diffusion layers 20, the spaces being generated owing to the concavo-convex shape owned by the separators. Then, the recessed portions function as gas flow passages (GPa, GPc) for flowing gas therethrough at an operation time of the fuel cell 100.

Specifically, the fuel gas (for example, hydrogen or the like) is flown through the gas flow passages GPa of the anode separator 30a, and the oxidant gas (for example, oxygen, air or the like) is flown through the gas flow passages GPc of the cathode separator 30c. Meanwhile, recessed portions of the anode separator 30a and the cathode separator 30c when viewed from an opposite side with the membrane electrode assembly 10 side function as coolant passages CP for flowing coolant (for example, water) for cooling the fuel cell therethrough at the operation time of the fuel cell 100. Note that, in this embodiment, one composed of only the above-described electrode catalyst layers and one composed by forming the electrode catalyst layers on the above-described gas diffusion layers are referred to as electrodes for fuel cells.

<Polymer Electrolyte Membrane>

The polymer electrolyte membrane 11 has a function to selectively permeate protons, which are generated in the anode electrode catalyst layer 13a at the operation time of the fuel cell 100, to the cathode electrode catalyst layer 13c along a membrane thickness direction. Moreover, the polymer electrolyte membrane 11 also has a function as a diaphragm for preventing mixture of the fuel gas to be supplied to the anode side and the oxidant gas to be supplied to the cathode side.

The polymer electrolyte membrane 11 is broadly classified into a fluorine-based polymer electrolyte membrane and a hydrocarbon-based polymer electrolyte membrane based on a type of ion exchange resin as a constituent material. As the ion exchange resin that composes the fluorine-based polymer electrolyte membrane, for example, there are mentioned: a perfluorosulfonic acid polymer such as NAFION (registered trademark, made by DuPont), ACIPLEX (registered trademark, made by Asahi Kasei Chemicals Corporation), and FLEMION (registered trademark, made by Asahi Glass Co., Ltd.); a perfluorocarbon phosphonic acid polymer; a trifluorostyrene sulfonic acid polymer; an ethylene tetrafluoroethylene-g-styrene sulfonic acid polymer; an ethylene-tetrafluoroethylene copolymer; a polyvinylidene fluoride-perfluorocarbon sulfonic acid polymer; and the like. From a viewpoint of enhancing the power generation performance such as heat resistance and chemical stability, these fluorine-based polymer electrolyte membranes are preferably used. Particularly preferably, the fluorine-based polymer electrolyte membrane composed of the perfluorocarbon sulfonic acid polymer is used.

Moreover, as the ion exchange resin that composes the hydrocarbon-based polymer electrolyte membrane, for example, there are mentioned sulfonated polyether sulfone (S-PES), sulfonated polyaryl ether ketone, sulfonated polybenzimidazole, alkyl phosphonated polybenzimidazole, alkyl sulfonated polystyrene, sulfonated polyether ether ketone (S-PEEK), sulfonated polyphenylene (S-PPP), and the like. From production viewpoints such that raw materials are inexpensive, that manufacturing processes are simple, and that material selectivity is high, these hydrocarbon-based polymer electrolyte membranes are preferably used. Note that, with regard to the above-mentioned ion exchange resin, only one thereof may be used singly, or two or more thereof may be used in combination. Moreover, the ion exchange resin is not limited to the above-mentioned materials, and other materials can also be used.

A thickness of the polymer electrolyte membrane just needs to be appropriately decided in consideration for characteristics of the fuel cell to be obtained, and is not particularly limited. In usual, the thickness of the polymer electrolyte membrane is 5 to 300 μm. If the thickness of the polymer electrolyte membrane stays within such a numeric value range, then strength at the time of membrane production, durability at the time of usage, and a balance of output characteristics at the time of usage can be controlled appropriately.

<Electrode Catalyst Layer>

The electrode catalyst layers (anode electrode catalyst layer 13a, cathode electrode catalyst layer 13c) are layers in which battery reactions actually progress. Specifically, an oxidation reaction of hydrogen progresses in the anode electrode catalyst layer 13a, and a reduction reaction of oxygen progresses in the cathode electrode catalyst layer 13c. The electrode catalyst layers of this embodiment contain at least the above-mentioned catalyst particles for fuel cells, and the above-described catalyst particles for fuel cells are carried on the carrier. Moreover, the electrode catalyst layers contain a proton conductive material so as to improve the proton-conductivity of the electrode catalyst layers.

(Catalyst Particles)

At least one of the anode electrode catalyst layer 13a and the cathode electrode catalyst layer 13c according to this embodiment contains an electrode catalyst for fuel cells, which is composed by carrying the above-mentioned catalyst particles for fuel cells on the carrier. However, with regard to the anode electrode catalyst layer 13a, other catalyst particles heretofore known in public may be contained therein if the other catalyst particles have a catalytic function for the oxidation reaction of hydrogen. In a similar way, with regard to the cathode electrode catalyst layer 13c, other catalyst particles heretofore known in public may be contained therein if the other catalyst particles have a catalytic function for the reduction reaction of oxygen.

As specific examples of the other catalyst particles, there can be mentioned: at least one metal selected from the group consisting of platinum (Pt), ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mn), vanadium (V), molybdenum (Mo), gallium (Ga) and aluminum (Al); and mixtures, alloys and the like according to arbitrary combinations of these. Note that it is not necessary that the other catalyst particles contained in the anode electrode catalyst layer and the cathode electrode catalyst layer be the same, and the catalyst particles can be appropriately selected so as to exert the desired functions as described above.

A size of the other catalyst particles is not particularly limited, and a size similar to that of the catalyst particles heretofore known in public can be employed. In this event, an average particle diameter of the other catalyst particles is preferably 1 to 30 nm, more preferably 1 to 20 nm. If the average particle diameter of the other catalyst particles stays within such a range, then a balance between easiness to carry the catalyst particles and a catalyst utilization ratio related to an effective electrode area in which the electrochemical reaction progresses can be appropriately controlled. Note that the average particle diameter of the other catalyst particles can be defined as an average value of crystallite diameters obtained by half widths of diffraction peaks of the catalyst particles in X-ray diffraction or as an average value of particle diameters of the catalyst particles, which are investigated by a transmission electron microscope.

(Carrier)

It is preferable that the carrier for carrying the above-described catalyst particles be a conductive carrier. That is to say, it is preferable that the carrier be one that functions as an electron conduction path concerned with transfer of electrons between the catalyst particles and other member. Moreover, the catalyst particles are carried on the conductive carrier, thus making it possible to form a thick electrode catalyst layer, and further, making it possible to use the fuel cell at a high current density.

The conductive carrier just needs to be one, which has a specific surface area for carrying the catalyst particles in a desired dispersion state, and has sufficient electron conductivity, and preferably, in which a main component is carbon. Specifically, there can be mentioned: carbon black such as acetylene black, channel black, oil furnace black, gas furnace black (for example, Vulcan), lamp black, thermal black and Ketjen black (registered trademark); Black Pearl; graphitized acetylene black; graphitized channel black; graphitized oil furnace black; graphitized gas furnace black; graphitized lamp black; graphitized thermal black; graphitized Ketjen black; graphitized Black Pearl; carbon nanotube; carbon nanofiber; carbon nano-horn; carbon fibril; activated carbon; coke; natural graphite; artificial graphite; and the like. Moreover, as the conductive carrier, there can also be mentioned zeolite template carbon (ZTC) having a structure in which nano-size belt-like graphenes are regularly coupled to one another three-dimensionally.

Note that "main component is carbon" refers to that the conductive carrier contains carbon atoms as a main component, and is a concept including both of that the conductive carrier is composed of only the carbon atoms and that the conductive carrier is substantially composed of the carbon atoms. Depending on the circumstances, elements other than the carbon atoms may be contained in order to enhance the characteristics of the fuel cell. Moreover, "substantially composed of the carbon atoms" stands for that contamination of impurities with approximately 2 to 3 mass % or less can be permitted.

It is preferable that such a BET specific surface area of the conductive carrier be a specific surface area sufficient for carrying the catalyst particles in a highly dispersed state, and is preferably 10 to 5000 $m^2/g$. If the specific surface area of the conductive carrier stays within such a numeric range, then a balance between dispersibility of the catalyst and such an effective utilization ratio of the catalyst in the conductive carrier can be appropriately controlled. Note that, as the conductive carrier, one that has primary pores and one that does not have the primary pores can be used as appropriate.

A size of the conductive carrier is not particularly limited, either. However, from viewpoints of the easiness to carry the catalyst, and of controlling the thickness of the electrode catalyst layer within an appropriate range, it is recommended that an average particle diameter of the conductive carrier be set approximately 5 to 200 nm, preferably 10 to 100 nm.

A carried concentration of the catalyst particles for fuel cells according to this embodiment in the conductive carrier is preferably 2 to 70 mass % with respect to the whole amount of the electrode catalyst. If the carried amount of the catalyst particles stays within such a numeric value range, then a balance between a dispersion degree of the catalyst particles on the conductive carrier and the catalyst performance can be appropriately controlled. Moreover, an increase of the thickness of the electrode catalyst layer can be suppressed. Note that the carried concentration of the catalyst particles in the conductive carrier can be measured by the inductively coupled plasma emission spectroscopic analysis method (ICP).

(Proton Conductive Material)

As the proton conductive material, for example, a polymer electrolyte material having a proton donating group can be mentioned. Then, the polymer electrolyte material is broadly classified into a fluorine-based polymer electrolyte material and a hydrocarbon-based polymer electrolyte material based on a type of ion exchange resin as a constituent material.

As the ion exchange resin that composes the fluorine-based polymer electrolyte material, for example, there are mentioned: a perfluorocarbon sulfonic acid polymer such as NAFION, ACIPLEX and FLEMION; a perfluorocarbon phosphonic acid polymer; a trifluorostyrene sulfonic acid polymer; an ethylene tetrafluoroethylene-g-styrene sulfonic acid polymer; an ethylene-tetrafluoroethylene copolymer; a polyvinylidene fluoride-perfluorocarbon sulfonic acid polymer; and the like. From a viewpoint of enhancing the power generation performance such as heat resistance and chemical stability, these fluorine-based polymer electrolyte materials are preferably used, and particularly preferably, the perfluorocarbon sulfonic acid polymer is used.

Moreover, as the ion exchange resin that composes the hydrocarbon-based polymer electrolyte material, for example, there are mentioned: sulfonated polyether sulfone (S-PES), sulfonated polyaryl ether ketone; sulfonated polybenzimidazole; alkyl phosphonated polybenzimidazole, alkyl sulfonated polystyrene, sulfonated polyether ether ketone (S-PEEK), sulfonated polyphenylene (S-PPP), and the like. From production viewpoints such that raw materials are inexpensive, that production processes are simple, and that material selectivity is high, these hydrocarbon-based polymer electrolyte materials are preferably used. Note that, with regard to the above-mentioned ion exchange resin, only one thereof may be used singly, or two or more thereof may be used in combination. Moreover, the ion exchange resin is not limited to the above-mentioned materials, and other materials can also be used.

<Gas Diffusion Layer>

The gas diffusion layer (anode gas diffusion layer 20a, cathode gas diffusion layer 20c) has a function to diffuse the gas (fuel gas or oxidant gas), which is supplied to the gas flow passages (GPa, GPc) of each of the separators, to the electrode catalyst layer (13a, 13c). Moreover, the gas diffusion layer has a function as the electron conduction path.

A material that composes a substrate of the gas diffusion layer is not particularly limited, and the knowledge heretofore known in public is referred to as appropriate. For example, there is mentioned a sheet-like material, which has conductivity and porosity, such as carbon-made woven fabric and nonwoven fabric, sheet-like paper, metal gauze or metal mesh, punching metal, and expand metal. A thickness of the substrate just needs to be appropriately decided in consideration of characteristics of the gas diffusion layer to be obtained; however, just needs to be set at approximately 30 to 500 μm. If the thickness of the substrate is a value within such a range, then it is possible to appropriately control a balance between mechanical strength and diffusibility of gas, water or the like.

It is preferable that the gas diffusion layer contain a water repellent for the purpose of preventing a flooding phenomenon and the like by further enhancing water repellency. The water repellent is not particularly limited; however, a fluorine-based polymer material and an olefin-based polymer material are mentioned. As the fluorine-based polymer material, there are mentioned polytetrafluoroethylene (PTFE), polyvinylidene fluoride (PVdF), polyhexafluoropropylene (PHFP), a tetrafluoroethylene-hexafluoropropylene copolymer (TFE-HFP) and the like. Moreover, as the olefin-based polymer material, polypropylene (PP), polyethylene (PE) and the like are mentioned.

Moreover, in order to further enhance the water repellency, the gas diffusion layer may be one, in which a carbon particle layer (microporous layer; MPL) made of an aggregate of carbon particles containing a water repellent is provided on the electrode catalyst layer side of the substrate.

The carbon particles contained in the carbon particle layer are not particularly limited, and a material heretofore known in public, such as carbon black, graphite and expanded graphite, can be appropriately employed. Among them, carbon black such as oil furnace black, channel black, lamp black, thermal black and acetylene black is preferably used since electron conductivity thereof is excellent and a specific surface area thereof is large. It is recommended that an average particle diameter of the carbon particles be set at approximately 10 to 100 nm. In such a way, high drainage by capillarity can be obtained, and in addition, it also becomes possible to enhance contact properties of the carbon particles with the electrode catalyst layer.

As the water repellent for use in the carbon particle layer, a similar one to the above-mentioned water repellent is mentioned. In particular, a fluorine-based polymer material is preferably used since the fluorine-based polymer material is excellent in water repellency, corrosion resistance at the time of an electrode reaction, and the like.

It is recommended that a mixture ratio of the carbon particles and the water repellent in the carbon particle layer be set at approximately 90:10 to 40:60 (carbon particles: water repellent) in a mass ratio in consideration of a balance between the water repellency and the electron conductivity. Note that a thickness of the carbon particle layer is not particularly limited, either, and just needs to be appropriately decided in consideration of the water repellency of the gas diffusion layer to be obtained.

<Separator>

Each of the separators 30 is obtained, for example, in such a manner that such an concavo-convex shape as shown in FIG. 2 is formed by implementing pressing treatment for a thin plate with a thickness of 0.5 mm or less; however, the separator 30 is not limited to the form as described above. That is to say, for example, cutting treatment is implemented for a flat metal plate (metal substrate), whereby the concavo-convex shape that composes the gas flow passages and the coolant flow passages may be formed.

A material that composes the separator is not particularly limited; and a material heretofore known in public can be applied. It is preferable that the material be a material, which it is difficult for the supplied gas to permeate, and it is preferable that the material be a material, through which it is easy for a current taken out by the battery reaction to flow. Specifically, there are mentioned: a metal material such as iron, titanium, aluminum, and alloys of these; a metal material in which the corrosion resistance is enhanced by forming a coating film of a carbon material or the like thereon; a polymer material (conductive plastics) to which the conductivity is imparted by the metal material, the carbon material or the like. Note that stainless steel is included in an iron alloy. Each of these may be a single layer one or one having a laminated structure of two or more layers.

As described above, the catalyst particles of this embodiment are suitable for use in an electrochemical device such as a polymer electrolyte fuel cell. Moreover, the catalyst particles of this embodiment can also be used for an electrochemical device such as a phosphoric acid fuel cell.

EXAMPLES

The present invention will be described below more in detail by examples and comparative examples; however, the present invention is not limited to these examples.

Example 1

First, nickel chloride(II) ($NiCl_2$) was dissolved into ultra-pure water, and an aqueous nickel solution with a concentration of 0.105 M was prepared. Moreover, 1.2 g of trisodium citrate dihydrate and 0.40 g of sodium borohydride were mixed into 100 mL of ultrapure water, and an aqueous reducing agent solution was prepared. Moreover, a Ketjen black solution, in which 0.2 g of Ketjen black was mixed into 100 mL of ultrapure water, was prepared.

Next, 21.9 mL of the above-described aqueous nickel solution was mixed into 1000 mL of ultrapure water, and thereafter, the above-described aqueous reducing agent solution was added thereto, followed by stirring for 30 minutes at room temperature (25° C.), whereby a dispersion of metal particles composed of nickel was prepared.

Moreover, 0.41 mL of an aqueous platinic chloride solution with a concentration of 1.16 M was added to the above-described metal particle dispersion, followed by stirring for 30 minutes at room temperature (25° C.), whereby catalyst particles, in which noble metal layers were formed on the peripheries of the metal particles, were prepared.

Then, the above-described Ketjen black dispersion was mixed into the dispersion of the catalyst particles, followed by stirring for 48 hours at room temperature (25° C.), whereby the catalyst particles were carried on Ketjen black. Thereafter, such Ketjen black that carried the catalyst particles thereon was filtrated, and was washed by ultrapure water three times, followed by drying at 60° C. for 12 hours or more in air, whereby catalyst particles of this example were prepared.

Example 2

Catalyst particles of this example were prepared in a similar way to Example 1 except for using an aqueous reducing agent solution, in which 1.5 g of trisodium citrate dehydrate and 0.40 g of sodium borohydride were mixed into 100 mL of ultrapure water.

Example 3

First, 0.78 g of trisodium citrate dehydrate and 0.20 g of sodium borohydride were mixed into 100 mL of ultrapure water, and an aqueous reducing agent solution was prepared.

Next, 14.3 mL of the aqueous nickel solution of Example 1 was mixed into 1000 mL of ultrapure water, and thereafter, the above-described aqueous reducing agent solution was added thereto, followed by stirring for 30 minutes at room temperature (25° C.), whereby a dispersion of metal particles composed of nickel was prepared.

Moreover, 0.27 mL of an aqueous platinic chloride solution with a concentration of 1.16 M was added to the above-described metal particle dispersion, followed by stirring for 30 minutes at room temperature (25° C.), whereby catalyst particles, in which noble metal layers were formed on peripheries of the metal particles, were prepared.

Then, the Ketjen black dispersion of Example 1 was mixed into a dispersion of the catalyst particles, followed by stirring for 48 hours at room temperature (25° C.), whereby the catalyst particles were carried on Ketjen black. Thereafter, such Ketjen black that carried the catalyst particles thereon was filtrated, and was washed by ultrapure water three times, followed by drying at 60° C. for 12 hours or more in air, whereby the catalyst particles of this example were prepared.

Example 4

First, nickel(II) sulfamate tetrahydrate was dissolved into ultrapure water, and an aqueous nickel solution with a concentration of 0.105 M was prepared. Moreover, 0.78 g of trisodium citrate dehydrate and 0.26 g of sodium borohydride were mixed into 100 mL of ultrapure water, and an aqueous reducing agent solution was prepared.

Next, 19.4 mL of the above-described aqueous nickel solution was mixed into 1000 mL of ultrapure water, and thereafter, the above-described aqueous reducing agent solution was added thereto, followed by stirring for 30 minutes at room temperature (25° C.), whereby a dispersion of metal particles composed of nickel was prepared.

Moreover, 1.22 mL of an aqueous dinitrodiamine platinum nitrate solution with a concentration of 0.51 M was added to the above-described metal particle dispersion, followed by stirring for 30 minutes at room temperature (25° C.), whereby catalyst particles, in which noble metal layers were formed on peripheries of the metal particles, were prepared.

Then, the Ketjen black dispersion of Example 1 was mixed into a dispersion of the catalyst particles, followed by stirring for 48 hours at room temperature (25° C.), whereby the catalyst particles were carried on Ketjen black. Thereafter, such Ketjen black that carried the catalyst particles thereon was filtrated, and was washed by ultrapure water three times, followed by drying at 60° C. for 12 hours or more in air, whereby the catalyst particles of this example were prepared.

Example 5

First, nickel sulfate (II) (NiSO4) was dissolved into ultrapure water, and an aqueous nickel solution with a concentration of 0.105 M was prepared. Moreover, 1.2 g of trisodium citrate dehydrate and 0.30 g of sodium borohydride were mixed into 100 mL of ultrapure water, and an aqueous reducing agent solution was prepared.

Next, 24.2 mL of the above-described aqueous nickel solution was mixed into 1000 mL of ultrapure water, and thereafter, the above-described aqueous reducing agent solution was added thereto, followed by stirring for 30 minutes at room temperature (25° C.), whereby a dispersion of metal particles composed of nickel was prepared.

Moreover, 0.47 mL of an aqueous dinitrodiamine platinum nitrate solution with a concentration of 0.51 M was added to the above-described metal particle dispersion, followed by stirring for 30 minutes at room temperature (25° C.), whereby catalyst particles, in which noble metal layers were formed on peripheries of the metal particles, were prepared.

Then, the Ketjen black dispersion of Example 1 was mixed into a dispersion of the catalyst particles, followed by stirring for 48 hours at room temperature (25° C.), whereby the catalyst particles were carried on Ketjen black. Thereafter, such Ketjen black that carried the catalyst particles thereon was filtrated, and was washed by ultrapure water three times, followed by drying at 60° C. for 12 hours or more in air, whereby the catalyst particles of this example were prepared.

Comparative Example 1

First, nickel(II) sulfamate tetrahydrate was dissolved into ultrapure water, and an aqueous nickel solution with a concentration of 0.105 M was prepared. Moreover, 1.57 g of trisodium citrate dehydrate and 0.39 g of sodium borohydride were mixed into 100 mL of ultrapure water, and an aqueous reducing agent solution was prepared.

Next, 38.9 mL of the above-described aqueous nickel solution was mixed into 1000 mL of ultrapure water, and thereafter, the above-described aqueous reducing agent solution was added thereto, followed by stirring for 30 minutes at room temperature (25° C.), whereby a dispersion of metal particles composed of nickel was prepared.

Moreover, 0.53 mL of an aqueous platinic chloride solution with a concentration of 1.16 M was added to the above-described metal particle dispersion, followed by stirring for 30 minutes at room temperature (25° C.), whereby catalyst particles, in which noble metal layers were formed on peripheries of the metal particles, were prepared.

Then, the Ketjen black dispersion of Example 1 was mixed into a dispersion of the catalyst particles, followed by stirring for 48 hours at room temperature (25° C.), whereby the catalyst particles were carried on Ketjen black. Thereafter, such Ketjen black that carried the catalyst particles thereon was filtrated, and was washed by ultrapure water three times, followed by drying at 60° C. for 12 hours or more in air, whereby the catalyst particles of this comparative example were prepared.

[Measurement of Thickness of Noble Metal Layers and Diameter of Metal Particles]

Figure 4:
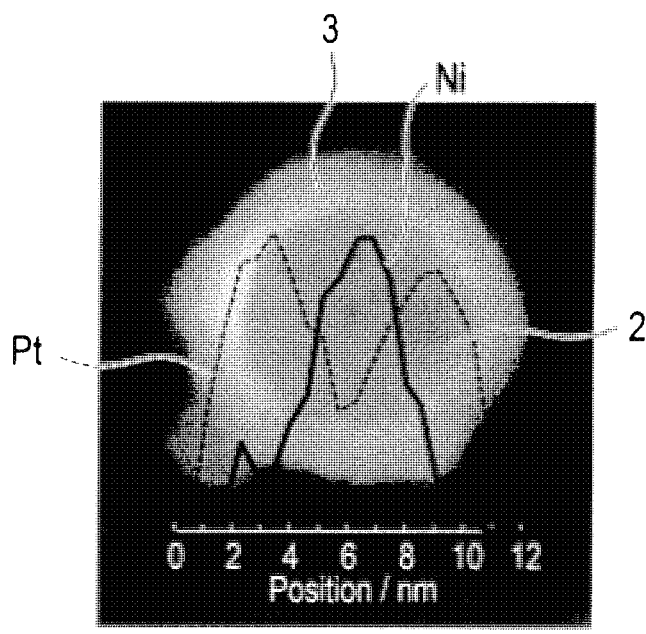
FIG. 4 is a view showing line analysis results of transmission electron microscope-energy dispersive X-ray spectrometry (TEM-EDX) in Example 1.

By the line analysis of TEM-EDX, a thickness of the noble metal layer and a diameter of the metal particles in each of the examples and the comparative examples were measured. Typical examples of results of the line analysis for the catalyst particles are shown in FIG. 4. Moreover, obtained results of an average thickness of the noble metal layer and an average diameter of the metal particles in each of the examples and the comparative examples are shown in Table 1.

[Mass Specific Activity Evaluation]

In conformity with the method described in "4 Analysis of oxygen reduction reaction on Pt/C catalyst) in Electrochemistry Vol. 79, No. 2, p. 116 to 121 (2011) (Hydrodynamic voltammogram (1) oxygen reduction (RRDE)), mass specific activity of the electrode catalyst in each of the examples and the comparative examples was measured.

Figure 5:
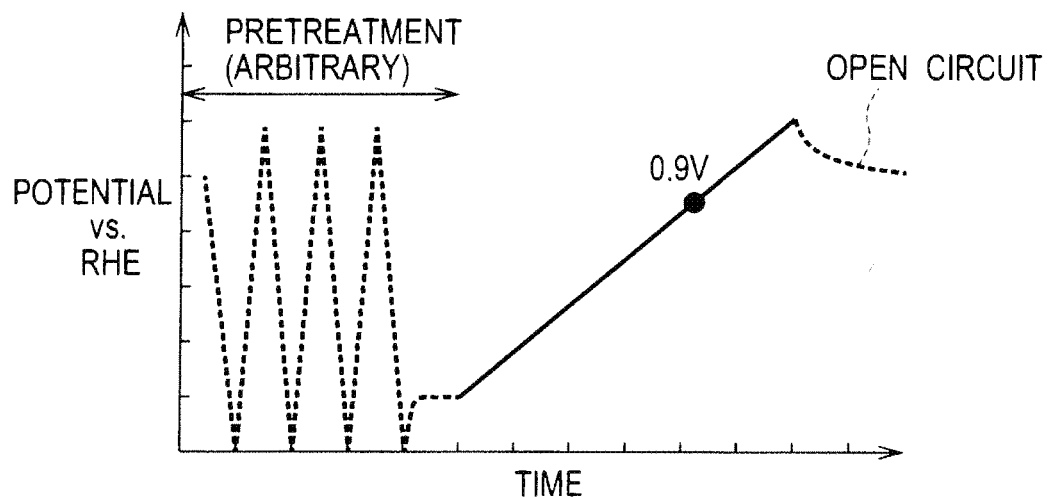
FIG. 5 is a graph for explaining a measurement method of mass specific activity.

Specifically, a regulated amount of the electrode catalyst in each of the examples and the comparative examples was coated on a glassy carbon electrode, and a catalyst layer according to each of the examples and the comparative examples was prepared. Next, the obtained catalyst layer was immersed into perchloric acid of 0.1 M, in which oxygen was saturated, and a current following the oxygen reduction was measured. Specifically, by using an electrochemical measuring device, as shown in FIG. 5, potential scanning was performed at a speed of 10 mV/s from 0.2 V to 1.2 V. Then, an influence of mass transfer (oxygen diffusion) was corrected by using the Koutecky-Levich equation, and thereafter, a current value at 0.9 V was extracted from the current obtained by the potential scanning. This was divided by an amount (g) of platinum in the carried catalyst, whereby the mass specific activity was calculated. The mass specific activity of the electrode catalyst of each of the examples and the comparative examples is listed in Table 1 in combination.

FIG. 6 is a graph showing a relationship between the mass specific activity of the electrode catalyst and the thickness of the noble metal layer in each of the examples and the comparative examples. As shown in FIG. 6, it can be confirmed that the mass specific activity is high in a case where the thickness of the noble metal layer is 1 nm to 3.2 nm, and that the mass specific activity is particularly excellent in a case where the thickness is 1.9 nm to 2.4 nm.

The entire contents of Japanese Patent Application No. 2013-034297 (filed on Feb. 25, 2013) are incorporated herein by reference.

The description has been made above of the present invention by the examples and the comparative examples; however, the present invention is not limited to these, and is modifiable in various ways within the scope of the spirit of the invention.

INDUSTRIAL APPLICABILITY

In the catalyst particles for fuel cells according to the present invention, the noble metal layer with a thickness of 1 nm to 3.2 nm was provided on the surface of each of the metal particles. Therefore, the thickness of the noble metal layer is optimized, whereby the catalyst particles can enhance the catalytic activity while reducing the amount of the noble metal since the electrochemical reactions represented by the above-described Reaction formulae (I) and (II) progress on the surface of the noble metal layer. Moreover, the production method of the present invention can prepare the above-described catalyst particles for fuel cells with ease.

REFERENCE SIGNS LIST

1 CATALYST PARTICLE FOR FUEL CELLS
2 METAL PARTICLE
3 NOBLE METAL LAYER

The invention claimed is:
1. A catalyst particle for a fuel cell, the catalyst particle comprising:
    a nickel particle having a particle diameter of 2 nm to 5.5 nm;
    a platinum layer on a surface of the nickel particle having a thickness of 1 nm to 3.2 nm,
        wherein the platinum layer covers at least 60% or more of the surface of the nickel particle, and
        wherein a ratio of number of moles of nickel to number of moles of platinum is in a range of 4.8-10.4.
2. A catalyst for a fuel cell, the catalyst comprising:
    the catalyst particle for a fuel cell according to claim 1; and

TABLE 1

|  | Number of moles of nickel (mmol) | Number of moles of platinum (mmol) | Ratio of number of moles of nickel to number of moles of platinum (Ni/Pt) | Average thickness of noble metal layers (nm) | Average diameter of metal particles (nm) | Mass specific activity (A $g_{Pt}^{-1}$) |
|---|---|---|---|---|---|---|
| Example 1 | 2.3 | 0.48 | 4.8 | 1.93 | 5.3 | 856 |
| Example 2 | 2.3 | 0.48 | 4.8 | 2.34 | 4.9 | 800 |
| Example 3 | 1.5 | 0.31 | 4.8 | 2.3 | 5 | 736 |
| Example 4 | 2.0 | 0.62 | 3.2 | 3.2 | 2.2 | 495 |
| Example 5 | 2.5 | 0.24 | 10.4 | 1.1 | 2 | 726 |
| Comparative example 1 | 4.1 | 0.61 | 6.7 | 0.3 | 2.1 | 378 | a conductive carrier that carries thereon the catalyst particle.

3. A method for producing the catalyst particle according to claim 1 for the fuel cell, the method comprising:
preparing a precursor solution having a concentration of 2.5 mM or less of nickel by dispersing a salt of the nickel or a complex of the nickel into a solvent, and thereafter preparing a nickel particle dispersion by adding a reducing agent to the precursor solution; and
forming the platinum layer on the surface of the nickel particle by adding a platinum salt or a platinum complex to the nickel particle dispersion.

4. The catalyst particle for a fuel cell according to claim 1, wherein the platinum layer has a thickness of 1.9 nm to 2.4 nm.

5. The catalyst particle for a fuel cell according to claim 1, wherein the platinum layer forms a layered structure in which a plurality of monoatomic layers of platinum are stacked on one another.

6. The catalyst particle for a fuel cell according to claim 1, wherein the ratio of the average thickness of the platinum layer to the average diameter of the nickel particle is in a range of 0.36-0.55.

7. The catalyst particle for a fuel cell according to claim 1, wherein a mass specific activity of the catalyst particle is between 726-856 A $g_{Pt}^{-1}$.

8. The catalyst particle for a fuel cell according to claim 1, wherein the average thickness of the platinum layer is between 1.1 nm to 2.34 nm.

9. A catalyst particle for a fuel cell, the catalyst particle comprising:
a metal particle comprising either one of metal other than a noble metal or an alloy of the metal other than the noble metal and a noble metal, and having a particle diameter of 2 nm to 5.5 nm; and
a platinum layer that is provided on a surface of the metal particle, and has a thickness of 1 nm to 3.2 nm,
wherein the platinum layer covers at least 60% or more of the surface of the metal particle, and
wherein a ratio of number of moles of the metal particle to number of moles of platinum is in a range of 4.8-10.4.

10. The catalyst particle for a fuel cell according to claim 1, wherein the catalyst particle is provided in an anode or a cathode.

* * * * *